United States Patent
Cronin et al.

(10) Patent No.: US 10,580,011 B1
(45) Date of Patent: Mar. 3, 2020

(54) NFC-BASED OPTIONS SELECTION

(71) Applicant: Blazer and Flip Flops, Inc., San Diego, CA (US)

(72) Inventors: John Cronin, Bonita Springs, FL (US); Joseph George Bodkin, Fort Myers, FL (US)

(73) Assignee: BLAZER AND FLIP FLOPS, INC., San Diego, CA (US)

( * ) Notice: Subject to any disclaimer, the term of this patent is extended or adjusted under 35 U.S.C. 154(b) by 364 days.

(21) Appl. No.: 14/970,338

(22) Filed: Dec. 15, 2015

Related U.S. Application Data

(60) Provisional application No. 62/093,298, filed on Dec. 17, 2014.

(51) Int. Cl.
| | |
|---|---|
| *G06Q 30/00* | (2012.01) |
| *G06Q 20/20* | (2012.01) |
| *G06Q 20/32* | (2012.01) |
| *H04B 5/00* | (2006.01) |
| *H04W 4/80* | (2018.01) |
| *G06F 3/0488* | (2013.01) |
| *G06F 3/0482* | (2013.01) |

(52) U.S. Cl.
CPC ......... *G06Q 30/012* (2013.01); *G06Q 20/204* (2013.01); *G06Q 20/3278* (2013.01); *H04B 5/0031* (2013.01); *H04W 4/80* (2018.02); *G06F 3/0482* (2013.01); *G06F 3/0488* (2013.01)

(58) Field of Classification Search
None
See application file for complete search history.

(56) References Cited

U.S. PATENT DOCUMENTS

| | | |
|---|---|---|
| 5,473,143 A | 12/1995 | Vak et al. |
| 6,973,172 B1 | 12/2005 | Bitove et al. |
| 7,828,204 B2 | 11/2010 | Fiebiger et al. |
| 7,832,646 B1 | 11/2010 | Leason |
| 7,844,512 B2 | 11/2010 | Richards et al. |
| 8,065,190 B2 | 11/2011 | Collas et al. |
| 8,105,772 B2 | 4/2012 | Mardikar et al. |
| 8,306,860 B2 | 11/2012 | Dunsmore et al. |
| 8,474,701 B1 | 7/2013 | Meek et al. |
| 8,494,913 B2 | 7/2013 | Cavagnaro |
| 8,498,900 B1 | 7/2013 | Spirin et al. |
| 8,577,803 B2 | 11/2013 | Chatterjee et al. |

(Continued)

FOREIGN PATENT DOCUMENTS

| | | |
|---|---|---|
| CN | 103679475 | 3/2014 |
| EP | 2 533 186 | 12/2012 |

(Continued)

OTHER PUBLICATIONS

U.S. Appl. No. 14/970,304, John Cronin, NFC Transaction Choices, filed Dec. 15, 2015.

(Continued)

*Primary Examiner* — Florian M Zeender
*Assistant Examiner* — Denisse Y Ortiz Roman
(74) *Attorney, Agent, or Firm* — Polsinelli LLP

(57) ABSTRACT

A mobile electronic device corresponding to the present invention communicates with a point-of-sale terminal using near field data communications when making a purchase, prompting an offer regarding a warranty on an item purchased before the purchase is complete.

19 Claims, 7 Drawing Sheets

(56) References Cited

U.S. PATENT DOCUMENTS

| | | |
|---|---|---|
| 8,690,054 B1 | 4/2014 | Cummins et al. |
| 8,714,439 B2 | 5/2014 | Brendell et al. |
| 8,718,554 B2 | 5/2014 | Abel |
| 8,762,211 B2 | 6/2014 | Killian et al. |
| 8,783,561 B2 | 7/2014 | Wesley |
| 8,788,324 B1 | 7/2014 | Shetty et al. |
| 8,799,085 B2 | 8/2014 | Fisher |
| 8,805,726 B2 | 8/2014 | Fisher |
| 8,811,895 B2 | 8/2014 | Reisgies et al. |
| 8,954,004 B1 | 2/2015 | Wang et al. |
| 9,582,826 B2 | 2/2017 | Calman et al. |
| 9,646,303 B2 | 5/2017 | Karpenko et al. |
| 9,672,511 B2 | 6/2017 | Lim |
| 9,734,091 B2 | 8/2017 | Kadi et al. |
| 9,985,699 B1 | 5/2018 | Cronin |
| 10,262,311 B1 | 4/2019 | Cronin |
| 10,262,318 B1 | 4/2019 | Cronin |
| 10,348,368 B2 | 7/2019 | Cronin |
| 10,516,964 B2 | 12/2019 | Dotan et al. |
| 2002/0026348 A1 | 2/2002 | Fowler et al. |
| 2002/0062249 A1 | 5/2002 | Iannacci |
| 2004/0010597 A1 | 1/2004 | Kirschner et al. |
| 2004/0220876 A1 | 11/2004 | Liu |
| 2005/0004839 A1 | 1/2005 | Bakker et al. |
| 2005/0210240 A1 | 9/2005 | Barron |
| 2006/0131390 A1 | 6/2006 | Kim |
| 2006/0206378 A1 | 9/2006 | Ficalora |
| 2007/0022375 A1 | 1/2007 | Walker |
| 2007/0032225 A1 | 2/2007 | Konicek et al. |
| 2007/0190939 A1 | 8/2007 | Abel |
| 2007/0192198 A1 | 8/2007 | Schwarzkopf |
| 2007/0203850 A1 | 8/2007 | Singh et al. |
| 2008/0011837 A1 | 1/2008 | Wesley |
| 2008/0078831 A1 | 4/2008 | Johnson et al. |
| 2008/0109335 A1 | 5/2008 | Keohane et al. |
| 2008/0120155 A1 | 5/2008 | Pliha |
| 2008/0133351 A1 | 6/2008 | White et al. |
| 2008/0147496 A1 | 6/2008 | Bal et al. |
| 2008/0150678 A1 | 6/2008 | Giobbi et al. |
| 2008/0167017 A1 | 7/2008 | Wentker et al. |
| 2008/0167961 A1 | 7/2008 | Wentker et al. |
| 2009/0082001 A1 | 3/2009 | Rahul et al. |
| 2009/0132362 A1 | 5/2009 | Fisher et al. |
| 2009/0138365 A1 | 5/2009 | Mueller et al. |
| 2009/0156190 A1 | 6/2009 | Fisher |
| 2009/0192935 A1 | 7/2009 | Griffin et al. |
| 2009/0276305 A1 | 11/2009 | Clopp |
| 2010/0010887 A1 | 1/2010 | Karlin et al. |
| 2010/0088149 A1 | 4/2010 | Sullivan et al. |
| 2010/0114677 A1 | 5/2010 | Carlson et al. |
| 2010/0124914 A1 | 5/2010 | Schmidt et al. |
| 2010/0125510 A1 | 5/2010 | Smith et al. |
| 2010/0190437 A1 | 7/2010 | Buhot |
| 2010/0211507 A1 | 8/2010 | Aabye et al. |
| 2010/0211679 A1 | 8/2010 | Kumar et al. |
| 2010/0274691 A1 | 10/2010 | Hammad et al. |
| 2010/0274853 A1 | 10/2010 | Carlson et al. |
| 2010/0309807 A1 | 12/2010 | Rautiainen |
| 2010/0312692 A1 | 12/2010 | Teicher |
| 2011/0016050 A1 | 1/2011 | Evans |
| 2011/0153438 A1 | 6/2011 | Dragt |
| 2011/0167133 A1 | 7/2011 | Jain |
| 2011/0202402 A1 | 8/2011 | Fowler et al. |
| 2011/0218849 A1 | 9/2011 | Rutigliano et al. |
| 2011/0230209 A1 | 9/2011 | Kilian |
| 2011/0258249 A1 | 10/2011 | Biggs et al. |
| 2011/0313922 A1 | 12/2011 | Ben Ayed |
| 2011/0320345 A1 | 12/2011 | Taveau et al. |
| 2012/0036076 A1 | 2/2012 | Vanderwall et al. |
| 2012/0078701 A1 | 3/2012 | Woods |
| 2012/0078735 A1 | 3/2012 | Bauer et al. |
| 2012/0089461 A1 | 4/2012 | Greenspan |
| 2012/0101882 A1 | 4/2012 | Todd |
| 2012/0109730 A1 | 5/2012 | Yoder et al. |
| 2012/0136732 A1 | 5/2012 | McMillen et al. |
| 2012/0148077 A1 | 6/2012 | Aldaz et al. |
| 2012/0160912 A1 | 6/2012 | Laracey |
| 2012/0166332 A1 | 6/2012 | Naaman |
| 2012/0185315 A1 | 7/2012 | VanDerheide et al. |
| 2012/0209749 A1 | 8/2012 | Hammad et al. |
| 2012/0221401 A1 | 8/2012 | Brown et al. |
| 2012/0253913 A1 | 10/2012 | Richard |
| 2012/0330744 A1 | 12/2012 | Aissa |
| 2013/0006773 A1 | 1/2013 | Lutnick et al. |
| 2013/0006782 A1 | 1/2013 | Schwarzkopf et al. |
| 2013/0020389 A1 | 1/2013 | Barnett |
| 2013/0059534 A1 | 3/2013 | Sobalvarro et al. |
| 2013/0067546 A1 | 3/2013 | Thavasi et al. |
| 2013/0080241 A1 | 3/2013 | Fisher |
| 2013/0080972 A1 | 3/2013 | Moshrefi et al. |
| 2013/0085835 A1 | 4/2013 | Horowitz |
| 2013/0095755 A1 | 4/2013 | Moreton et al. |
| 2013/0097040 A1 | 4/2013 | Fisher |
| 2013/0110261 A1 | 5/2013 | Lee et al. |
| 2013/0110682 A1 | 5/2013 | Rosenblatt et al. |
| 2013/0132282 A1 | 5/2013 | Shakkarwar |
| 2013/0144715 A1 | 6/2013 | Kranzley et al. |
| 2013/0191213 A1 | 7/2013 | Beck et al. |
| 2013/0191246 A1 | 7/2013 | Calman et al. |
| 2013/0204728 A1 | 8/2013 | Lichterman et al. |
| 2013/0211987 A1 | 8/2013 | Louie et al. |
| 2013/0215467 A1 | 8/2013 | Fein et al. |
| 2013/0218682 A1 | 8/2013 | Alterman et al. |
| 2013/0268378 A1 | 10/2013 | Yovin |
| 2014/0006205 A1 | 1/2014 | Berry et al. |
| 2014/0006272 A1* | 1/2014 | Calman .................. G06Q 30/06 705/40 |
| 2014/0058955 A1* | 2/2014 | Calman ................ G06Q 30/012 705/302 |
| 2014/0074637 A1 | 3/2014 | Hammad |
| 2014/0074691 A1 | 3/2014 | Bank et al. |
| 2014/0081855 A1 | 3/2014 | Hankins et al. |
| 2014/0089178 A1 | 3/2014 | Lee et al. |
| 2014/0089672 A1 | 3/2014 | Luna et al. |
| 2014/0100983 A1 | 4/2014 | Cavagnaro |
| 2014/0129357 A1 | 5/2014 | Goodwin |
| 2014/0138435 A1 | 5/2014 | Khalid |
| 2014/0172660 A1 | 6/2014 | Louie et al. |
| 2014/0173063 A1 | 6/2014 | Jeong et al. |
| 2014/0180826 A1 | 6/2014 | Boal |
| 2014/0189836 A1 | 7/2014 | Eyler |
| 2014/0201085 A1 | 7/2014 | Brendell et al. |
| 2014/0207680 A1 | 7/2014 | Rephlo |
| 2014/0214673 A1 | 7/2014 | Baca et al. |
| 2014/0222670 A1 | 8/2014 | Concannon |
| 2014/0274014 A1 | 9/2014 | Dodla |
| 2014/0277805 A1 | 9/2014 | Browne et al. |
| 2014/0279474 A1 | 9/2014 | Evans et al. |
| 2014/0298027 A1 | 10/2014 | Roberts et al. |
| 2014/0351057 A1 | 11/2014 | Kwon et al. |
| 2014/0351071 A1 | 11/2014 | Hong et al. |
| 2014/0351147 A1 | 11/2014 | Castrechini et al. |
| 2015/0019439 A1 | 1/2015 | Phillips |
| 2015/0073907 A1 | 3/2015 | Purves et al. |
| 2015/0088626 A1 | 3/2015 | Salmon et al. |
| 2015/0088631 A1 | 3/2015 | Mitchell |
| 2015/0095224 A1 | 4/2015 | Blythe |
| 2015/0100443 A1 | 4/2015 | Van Heerden et al. |
| 2015/0100803 A1 | 4/2015 | Chen et al. |
| 2015/0120473 A1* | 4/2015 | Jung ...................... G06Q 20/40 705/17 |
| 2015/0127549 A1 | 5/2015 | Khan |
| 2015/0154634 A1 | 6/2015 | Chiu et al. |
| 2015/0156311 A1 | 6/2015 | Adams et al. |
| 2015/0186871 A1 | 7/2015 | Laracey |
| 2015/0220915 A1 | 8/2015 | Rosenberg |
| 2015/0302398 A1 | 10/2015 | Desai et al. |
| 2015/0339318 A1 | 11/2015 | O'Toole et al. |
| 2015/0356551 A1 | 12/2015 | Dogin et al. |
| 2016/0055512 A1 | 2/2016 | Godsey et al. |
| 2016/0057619 A1 | 2/2016 | Lopez |
| 2016/0117667 A1 | 4/2016 | Kang et al. |
| 2016/0162882 A1 | 6/2016 | McClung |
| 2016/0192123 A1 | 6/2016 | Lim |

(56) References Cited

U.S. PATENT DOCUMENTS

| | | |
|---|---|---|
| 2016/0321641 A1 | 11/2016 | Cady et al. |
| 2017/0024733 A1 | 1/2017 | Purves |
| 2017/0287321 A1 | 10/2017 | Ann et al. |
| 2017/0295032 A1 | 10/2017 | Shin et al. |
| 2018/0041591 A1 | 2/2018 | Yoden |
| 2018/0050450 A1 | 2/2018 | Parrott et al. |
| 2018/0248589 A1 | 8/2018 | Cronin |
| 2019/0172035 A1 | 6/2019 | Cronin |
| 2019/0325426 A1 | 10/2019 | Cronin |
| 2019/0326957 A1 | 10/2019 | Cronin |

FOREIGN PATENT DOCUMENTS

| | | |
|---|---|---|
| WO | WO 2012/051071 | 4/2012 |
| WO | WO 2013/096486 | 6/2013 |

OTHER PUBLICATIONS

U.S. Appl. No. 14/970,311, John Cronin, NFC Triggered Incentives at Point-of-Sale, filed Dec. 15, 2015.
U.S. Appl. No. 14/970,314, John Cronin, NFC Ubiquitous Modular Payment Terminal, filed Dec. 15, 2015.
U.S. Appl. No. 14/970,319, John Cronin, NFC ATM Vending Machine With Added Two Way Non-financial Data, filed Dec. 15, 2015.
U.S. Appl. No. 14/970,328, John Cronin, Payments Data Source Tagging for Accounts Statements, filed Dec. 15, 2015.
U.S. Appl. No. 14/970,056, John Cronin, NFC-Based Payment as a Service, filed Dec. 15, 2015.
U.S. Appl. No. 14/970,069, John Cronin, NFC Improving Content Transfer in Low Bandwidth NFC Payments Systems, filed Dec. 15, 2015.
U.S. Appl. No. 14/970,080, John Cronin, NFC Increased Biometrics Based on Transactions Parameters, filed Dec. 15, 2015.
U.S. Appl. No. 14/970,091, John Cronin, Interaction With Purchaser in NFC-Based Transaction, filed Dec. 15, 2015.
U.S. Appl. No. 14/970,102, John Cronin, NFC Center, filed Dec. 15, 2015.
U.S. Appl. No. 14/970,340, John Cronin, Real Time Credit Offers, filed Dec. 15, 2015.
U.S. Appl. No. 14/970,125, John Cronin, NFC Transaction With Financial and Non-financial Data, filed Dec. 15, 2015.
U.S. Appl. No. 14/970,139, John Cronin, Bill Splitting and Account Delegation for NFC, filed Dec. 15, 2015.
U.S. Appl. No. 14/970,144, John Cronin, Automatic Shopping Based on Historical Data, filed Dec. 15, 2015.
Airplus—Mobile Payment—How It Will Transform Corporate Travel and Expense Management, Apr. 18, 2012.
Case Study—Bill Splitting App for Restaurantst, 2013.
AuthenTec—AuthenTec Fingerpring Technology Featured in Two New Fujitsu NFC-enabled Mobile Phones from NTT Docomo, Nov. 16, 2011.
Balaban, Dan; "Spanish Bank Installs 'First' Contactless ATMs", NFC Times, Apr. 5, 2011.
Blaze Mobile Wallet, Jan. 2008.
Boden, Rian; "PrivatBank cuts ATM costs with NFC", NFC World, Nov. 5, 2013.
Borison, Rebecca; "Google Wallet adds geolocated loyalty to iOS, combats Passbook", Mobile Commerce Daily, Feb. 7, 2014.
Carson, Biz; "BitPay brings one-touch payments to bitcoin with new NFC-compatible checkout app." Nov. 4, 2014.
Cluckey, Suzanne; "New guide offers a comprehensive view of ATM and mobile integration", Mobile Payments Today, Nov. 28, 2014.
CommBank Small Business app User Guide, CommonwealthBank. Jul. 11, 2014.
Dai, Weihui; "An Integrated Mobile Phone Payment System Based on 3G Network", Journal of Networks, vol. 6, No. 9, Sep. 2011.
Dragt, Bruce; "Universal Commerce: A Seamless, Personalized Purchase Experience for Today's Connected Consumers", A First Data White Paper, 2012.
Fraser, Jeff; "The Mobile Shopper: Lose Your Wallet." Jun. 1, 2014.
Girt Mobile—Mobile Application Development Ireland, Dec. 2, 2014.
Google Wallet Privacy Policy, Nov. 16, 2011.
Hoyos Labs, Nov. 28, 2014.
I-Free Unveils New and Improved "Wallet": NFC Mobile App Now Stores Contactless Transport Cards and Discount Coupons, i-Free News, Nov. 7, 2013.
FAQ and Support—CashCloud.com, Dec. 3, 2014.
Itautec Mobicash, Feb. 13, 2013. Link: https://youtu.be/-qaL2QHliok (youtube video, no pdf).
Khan, Vaseem; "Contactless card reader by Diebold leverages NFC technology at ATM's to give cash", NFC, Payments, Oct. 10, 2013.
Keane, Byran; "Key Takeaways From Money2020 Industry Conf", Deutsche Bank Markets Research. Oct. 10, 2013.
Lawler, Ryan; "Square's Order App Can Now Predict When You'll Arrive to Pick Up Your Cappuccino", TechCrunch, Oct. 8, 2014.
Ma et al., Xiaohua; "The Architecture of Mobile Wallet System Based on NFC (Near Field Communication)", Research Journal of Applied Sciences, Engineering and Technology 7(12): 2589-2595, 2014, ISSN: 2040-7459; e-ISSN: 2040-7467, Mar. 29, 2014.
Mastin, Michelle; "Square vs.. Intuit GoPayment: Mobile Credit Card Systems Compared", Bizfeed, PCWorld, Sep. 6, 2011.
Mobile_Commerce_NFC_Coupons_and_Loyalty_Acceptance—Technical Proposal, Version 1.0, Jul. 1, 2014.
More Magic: Mobile Banking & Payment Applications, Nov. 30, 2014.
NEC—Integrated E-Money Solution, Jan. 20, 2014.
"New breed of ATM Visits Times Square", Mobileinfo.com, Issue #2001, Jul. 30, 2001.
NFC & Contactless—Mobile and card solutions, NFC & Mobile Money Summit, Oct. 14-17, 2013.
NFC ReTag Free—WidgApp Mobile Solutions Tools, Google Play, Jul. 17, 2014.
NFC White Paper—Alcatel-Lucent Mobile Wallet Service, Dec. 2011.
NXP—NFC for embedded applications: Your Critical link for the Internet of Things, Aug. 21, 2014.
Patni, Chandra; "Pouch NFC PayPass & PayWave Card Issuance, pouch-let your mobile pay!", www.yes-wallet.com, Apr. 13, 2012.
"Pay2You Places: shopping by geolocation", Connexions, Jul. 5, 2013.
Pourghomi et al., Pardis; "Cloud-based NFC Mobile Payments", Journal of Internet Technology and Secured Transactions (JITST), vol. 2, Issues 1/2/3/4, Mar.-Dec. 2013.
Pourghomi et al., Pardis; "A Proposed NFC Payment Application", International Journal of Advanced Computer Science and Applications, vol. 4, No. 8, 2013).
Reardon, Marguerite; Tibken, Shara; "Apple takes NFC maintstream on iPhone 6; Apple Watch with Apple Pay", CNET, Sep. 9, 2014.
Rodrigues et al., Helena; "MobiPag: Integrated Mobile Payment, Ticketing and Couponing Solution Based on NFC", Sensors 2014, 14, 13389-13415;ISSN 124-8220, Jul. 24, 2014.
Sreekumar, Shiny; "Biometric Authentication in Mobile Payments", Master Thesis, Information Management, Faculty of Computer Sciences, Sep. 2010.
Tamas, Fabian; "NFC-enabled Automated Teller Machine", Obuda University, NIK. Nov. 28, 2014.
TapWise—Near Field Communication (NFC) Services and Cloud-Based Tag Management, Dec. 1, 2014.
VoxLoc—Mastercard announces high level of success with biometric system. Sep. 23, 2014.
White Paper—Beyond the Hype: Mobile Payments for Merchants, 2013.
White Paper—Cloud Based Ticketing: Next Generation Fare Collection, Mar. 23, 2014.
White Paper—Mobile Commerce in Retail: Loyalty and Couponing, Jan. 2014.
White Pater—The Role of the Trusted Service Manager in Mobile Commerce, Dec. 2013.

(56) References Cited

OTHER PUBLICATIONS

Wollenhaupt, Gary; "Five Ways Mobile Technology will Revolutionize ATMs", White Paper—ATM MarketPlace, 2013.
U.S. Appl. No. 14/970,102 Office Action dated May 1, 2017.
U.S. Appl. No. 14/970,102 Final Office Action dated Nov. 30, 2017.
U.S. Appl. No. 15/967,068, John Cronin, Managing NFC Data, filed Apr. 30, 2018.
U.S. Appl. No. 14/970,304 Final Office Action dated Oct. 1, 2018.
U.S. Appl. No. 14/970,080 Final Office Action dated Sep. 21, 2018.
U.S. Appl. No. 15/967,068 Office Action dated Sep. 4, 2018.
U.S. Appl. No. 14/970,125 Office Action dated Jun. 29, 2018.
U.S. Appl. No. 14/970,319 Final Office Action dated Jan. 28, 2019.
U.S. Appl. No. 14/970,125 Final Office Action dated Jan. 28, 2019.
U.S. Appl. No. 14/970,139 Final Office Action dated Jan. 18, 2019.
U.S. Appl. No. 14/970,144 Final Office Action dated Jan. 7, 2019.
U.S. Appl. No. 16/378,262, John Cronin, Transaction Modification Based on Real-Time Offers, filed Apr. 8, 2019.
U.S. Appl. No. 14/970,311 Final Office Action dated Jun. 13, 2019.
U.S. Appl. No. 14/970,056 Final Office Action dated Nov. 2, 2018.
U.S. Appl. No. 14/970,304 Office Action dated Jan. 12, 2018.
U.S. Appl. No. 14/970,314 Office Action dated Mar. 8, 2018.
U.S. Appl. No. 14/970,328 Office Action dated Feb. 14, 2018.
U.S. Appl. No. 14/970,069 Office Action dated Mar. 28, 2018.
U.S. Appl. No. 14/970,080 Office Action dated Feb. 26, 2018.
U.S. Appl. No. 14/970,311 Office Action dated Apr. 4, 2018.
U.S. Appl. No. 14/970,319 Office Action dated Jun. 26, 2018.
U.S. Appl. No. 14/970,056 Office Action dated Apr. 5, 2018.
U.S. Appl. No. 14/970,091 Office Action dated Jun. 1, 2018.
U.S. Appl. No. 14/970,340 Office Action dated Apr. 5, 2018.
U.S. Appl. No. 14/970,139 Office Action dated May 31, 2018.
U.S. Appl. No. 14/970,144 Office Action dated May 17, 2018.
U.S. Appl. No. 16/503,358, John Cronin, Managing NFC Devices Based on Downloaded Data, filed Jul. 3, 2019.
U.S. Appl. No. 14/970,304 Office Action dated Jul. 12, 2019.
U.S. Appl. No. 14/970,319 Office Action dated Jul. 10, 2019.
U.S. Appl. No. 14/970,080 Office Action dated Aug. 15, 2019.
U.S. Appl. No. 16/503,358 Office Action dated Jan. 7, 2020.
U.S. Appl. No. 14/970,311 Office Action dated Oct. 2, 2019.

\* cited by examiner

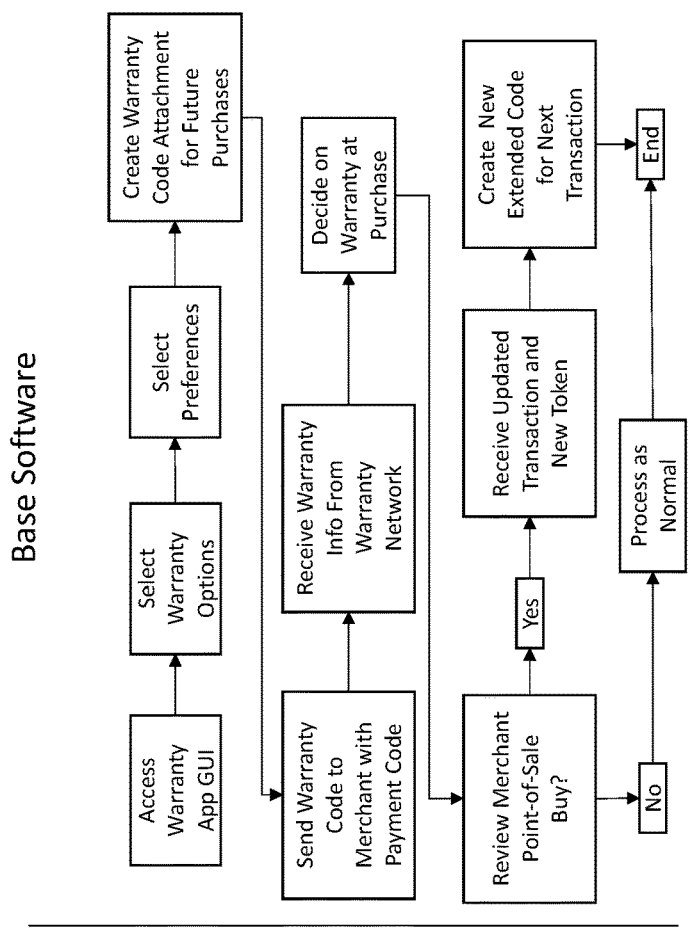
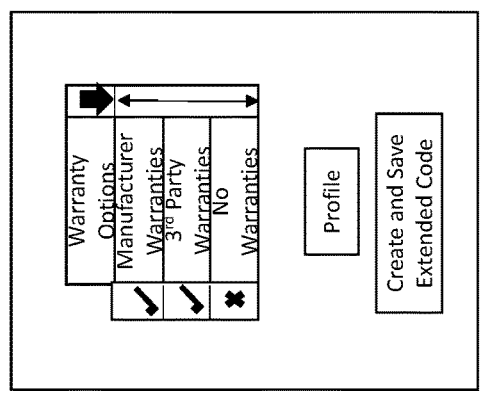
FIG. 3

Warranty Network

Warranty Network Base Software – Loading Database

Warranty Network Base Software

Warranty Network

Warranty Network Database

| Merchant & User ID | Transaction Number | Warranty Offered By | Warranty Cost | Warranty Length | Accepted/Declined |
|---|---|---|---|---|---|
| 0001 | 523 | Manufacturer | $100 | 3 years | Declined |
| 0001 | 523 | Manufacturer | $50 | 18 Months | Declined |
| 0001 | 523 | 3rd Party | $75 | 4 Years | Accepted |
| 0001 | 523 | 3rd Party | $25 | 6 Months | Declined |
| ... | ... | ... | ... | ... | ... |
| 0001 | 566 | 3rd Party | $200 | 1 Year | Declined |
| 0001 | 566 | 3rd Party | $100 | 6 Months | Declined |
| 0001 | 566 | Manufacturer | $200 | 1 Year | Declined |
| 0001 | 566 | Manufacturer | $100 | 6 Months | Declined |
| ... | ... | ... | ... | ... | ... |
| 0002 | 123 | Manufacturer | $250 | 2 Years | Declined |
| 0002 | 123 | 3rd Party | $100 | 2 Years | Accepted |
| 0002 | 123 | Manufacturer | $150 | 1 Year | Declined |
| 0002 | 123 | 3rd Party | $75 | 1 Year | Declined |
| ... | ... | ... | ... | ... | ... |

FIG. 6

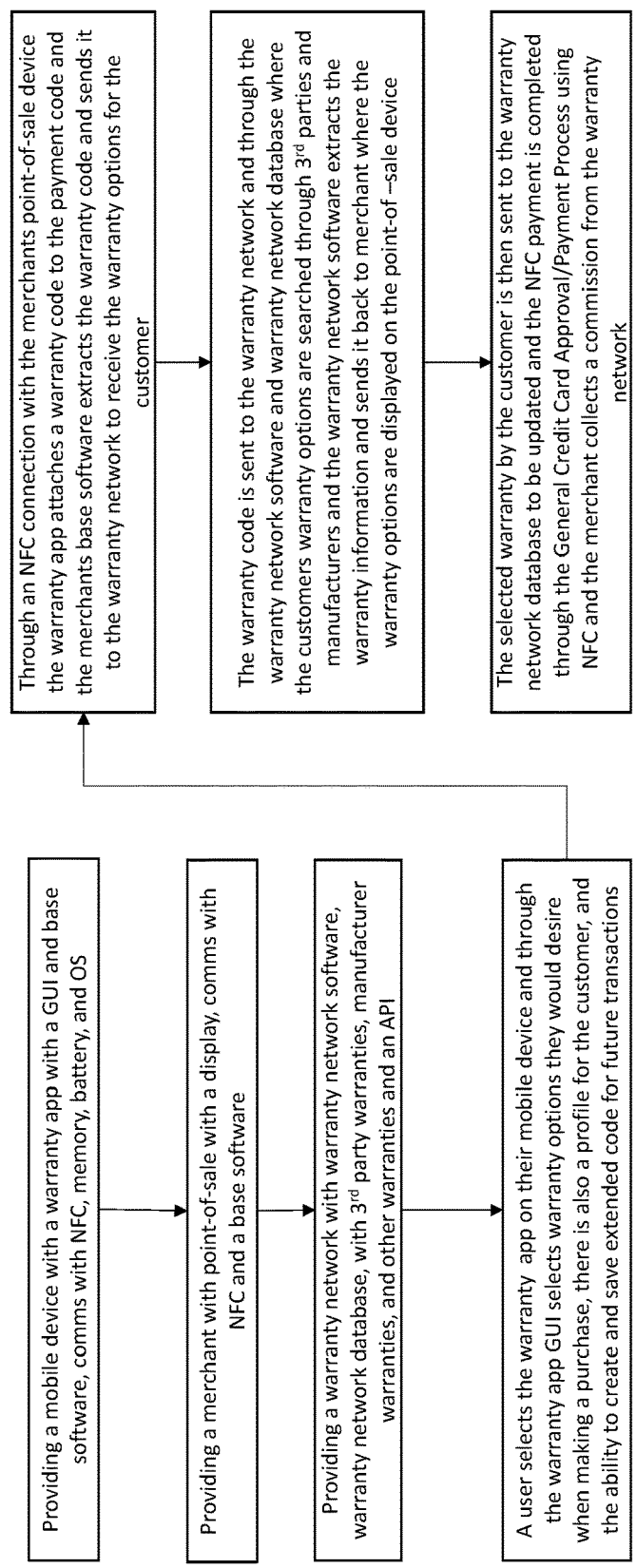

NFC-BASED OPTIONS SELECTION

CROSS-REFERENCE TO RELATED APPLICATIONS

The present application claims the priority benefit of U.S. provisional application No. 62/093,298 filed Dec. 17, 2014 entitled "Payment Processes with Warranty Options," the disclosure of which is hereby incorporated by reference.

BACKGROUND

Field of the Invention

The present invention generally relates to a user mobile device equipped with a near field data communication (NFC) interface that performs a purchase of an item linked to a warranty. More specifically, a mobile electronic device communicates with a point-of-sale terminal using near field data communications when making a purchase, prompting an offer regarding a warranty on an item purchased before the purchase is complete.

Description of the Related Art

Near field data communications (NFC) are currently being used by consumers to make secure financial transactions when purchasing goods or services. NFC is a standardized wireless data communication technology that communicates information over short distances. NFC commonly communicates using a frequency of 13.56 megahertz (MHz) with data rates approaching 424 kilo-bits per second (Kb/sec). NFC equipped devices of various sorts are available in the marketplace today.

Users of NFC-enabled user devices currently cannot purchase a warranty when making a purchase using NFC. A system and method where a user of a user device may purchase a warranty when they make a purchase using a NFC data communication interface on a user device is needed because consumers would benefit by having their purchase covered under a warranty as soon as they make their purchase.

SUMMARY OF THE PRESENTLY CLAIMED INVENTION

Embodiments of the present invention include a system and a method for receiving offers to acquire a warranty on an item at the point-of-sale with a mobile electronic device equipped with a near field communication (NFC) data communication interface. When purchasing an item at an NFC-equipped point-of-sale terminal, a mobile device may receive a communication over a NFC data communication interface indicating that a warranty may be acquired for that item. After receiving the communication, the warranty offer may be displayed in a graphical user interface (GUI) on a display at the mobile electronic device. A user of the mobile device may then accept the warranty offered by touching a selection box displayed in the GUI. After the user accepts the warranty offer, the mobile device may transmit payment information and information relating to the selected warranty over the NFC data communication interface to the point-of-sale terminal, and the transaction may then be processed.

BRIEF DESCRIPTION OF THE DRAWINGS

FIG. 3 includes an exemplary GUI setup that may be used in a system for providing NFC-based payment with warranty options, as well as a flowchart illustrating an exemplary base software method for providing NFC-based payment with warranty options.

FIG. 6 illustrates a matrix of information that may be stored in an exemplary warranty database used in a system for providing NFC-based payment with warranty options.

FIG. 7 is a flowchart illustrating an exemplary method for providing NFC-based payment with warranty options.

DETAILED DESCRIPTION

Embodiments of the present invention include a system and a method for linking items purchased using mobile electronic devices equipped with near field data communication (NFC) functionality to an offer to warrant the item purchased for a period of time.

Mobile electronic devices described herein include, yet are not limited to, smartphones, IPhones, Android phones, IPads, notebook computers, computers built into a car, and mobile devices dedicated to performing NFC communications. Payment authorization networks, and warranty networks described herein include, yet are not limited to, a computer and a computer server.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the figures and/or descriptions included herein.

Figure 1:
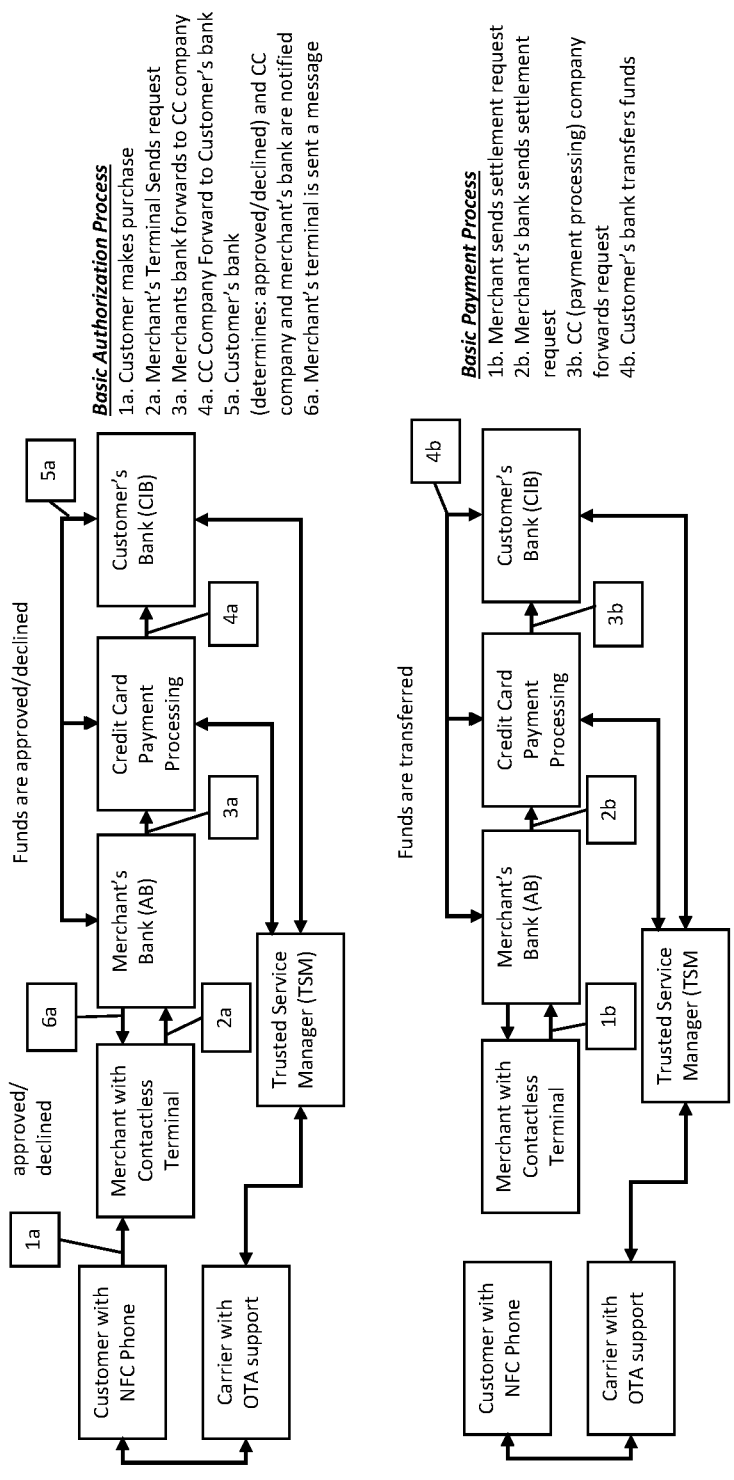
FIG. 1A is a flowchart illustrating a prior art method for basic authorization process based on near field communication (NFC).
FIG. 1B is a flowchart illustrating a prior art method for basic payment process based on NFC.

FIG. 1A is a flowchart illustrating a prior art method for basic authorization process based on near field communication (NFC). The basic authorization process begins when a customer with an NFC-capable phone sends a purchase order 1a to a merchant with a contactless terminal. The merchant with the contactless terminal then sends a request 2a to the merchant bank. Next, the merchant bank forwards credit card information 3a provided with the purchase order to a credit card payment processing center. The credit card payment processing center then forwards the credit card information 4a to the customer bank, and the customer bank approves or declines the purchase 5a. Next, a message is sent back to the merchant 6a indicating that the purchase has been approved or declined.

FIG. 1A also indicates that funds are approved or declined using a combination of the merchant bank, the credit card payment processing center, and the customer bank. Alternate communication pathways for performing the transactions are possible. The alternate communication pathways include a trusted service manager (TSM) communicating with the customer bank and with the credit card payment processing center, as well as a carrier with over the air (OTA) support communicating with the TSM and with the customer phone. The TSM is an entity that serves a trusted intermediary between mobile devices, networks that service mobile devices, and software applications. The TSM securely coordinates payments from a financial institution to a merchant that have been authorized by a mobile device. Examples of a carrier with OTA support are cellular companies like Verizon, AT&T, and T-Mobile. The basic authorization process may be performed using older phone lines, or it may be performed using modern wireless cellular networks.

FIG. 1B is a flowchart illustrating a prior art method for basic payment process based on NFC. The basic payment process of FIG. 1B involves the merchant sending a settlement request 1b to the merchant bank and the merchant bank then sending a settlement request 2b to the customer bank. Then the credit card payment processing company forwards the request 3b. Next, the customer bank transfers funds to the merchant bank 4b. Communications between the merchant bank, the credit card payment processing center, and the customer bank are used to transfer from the customer bank to the merchant bank. The customer phone may also communicate with a carrier with OTA support, as well as with a TSM. Here, the TSM also communicates with the credit card payment system and with the customer bank.

Figure 2:
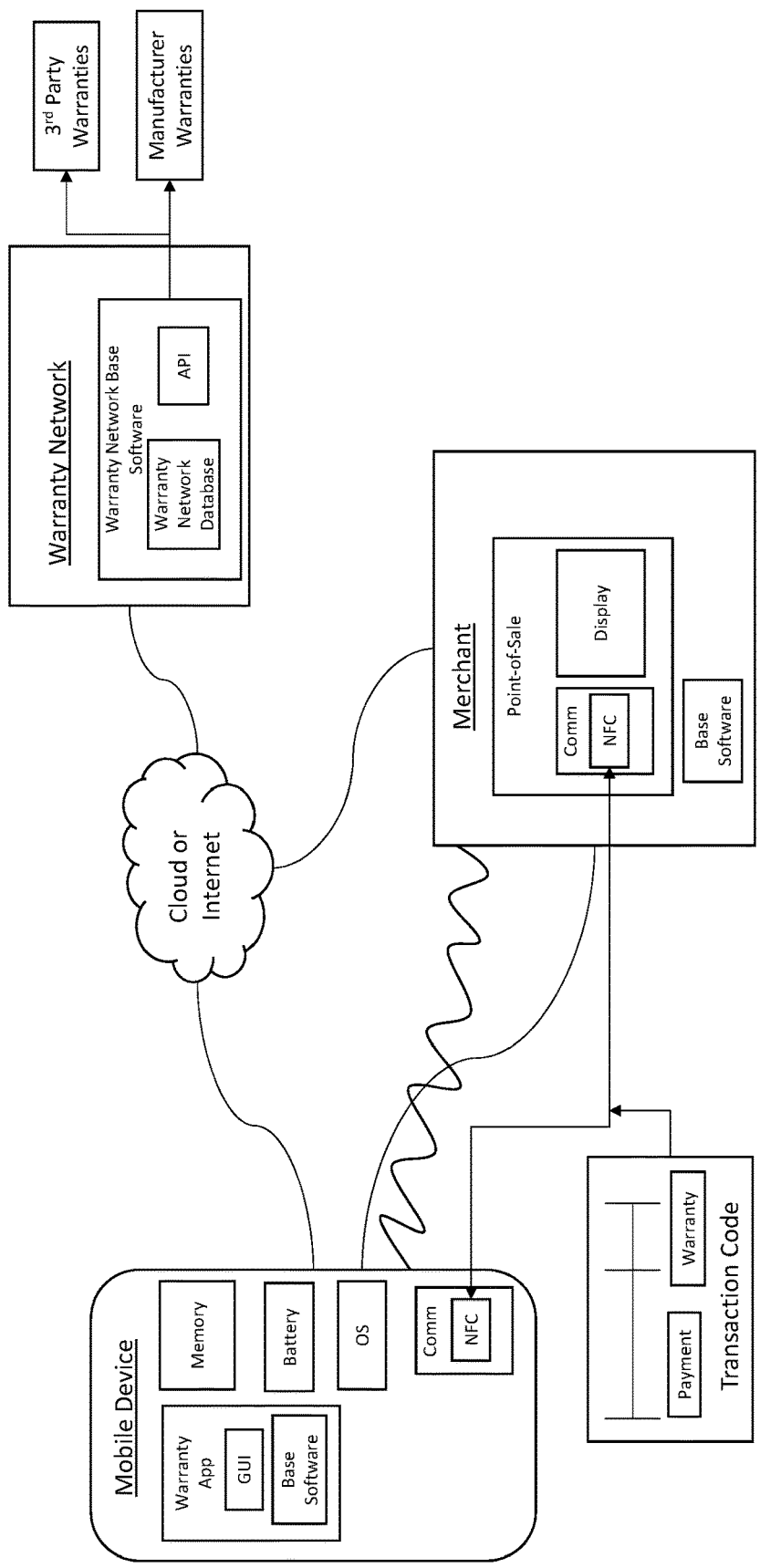
FIG. 2 illustrates a network environment in which an exemplary system for providing NFC-based payment with warranty options may be implemented.

FIG. 2 illustrates a network environment in which an exemplary system providing NFC-based payment with warranty options may be implemented. In such a system, a warranty may be acquired when a mobile device makes a purchase using a near field communication (NFC) interface. The network environment may include a mobile device communicating with a warranty network over the cloud or internet. The mobile device may also communicate with a point-of-sale terminal at a merchant that, in turn, communicates over the cloud or internet. The mobile device may include a memory, a battery, operating system software (OS), a warranty application (App) program, and an NFC data communication interface. The warranty application may include base software and a graphical user interface (GUI).

The warranty network may include a warranty network base software that includes a warranty database and an application program interface (API). The warranty network may communicate with manufacturers and with third parties when a warranty is purchased. The point-of-sale terminal at a merchant may include an NFC data communication interface and a display. Base software may also be running on the point-of-sale terminal or an associated computer at the merchant. A transaction code communicated between the mobile device and the point of sale terminal may include payment and warranty information.

In one embodiment of the invention, a mobile device may use NFC when making a purchase, after which the point-of-sale terminal may communicate one or more warranty options to the mobile device over the NFC data communication interface. A user of the mobile device may open the warranty application GUI, review warranty options, and select a warranty prior to completing the purchase. When a warranty is selected, a warranty code may be appended to the payment information, and the payment may then be processed. Additional details and other information regarding the warranty may then be received by the mobile device either over the NFC data communication interface at the mobile device or over another data communication interface at the mobile device. The mobile device may include a wireless data communication interface, including, yet not limited to, a Bluetooth, Wi-Fi, or a cellular 3G/4G/LTE data communication interface.

FIG. 3 includes an exemplary GUI setup that may be used in a system for providing NFC-based payment with warranty options, as well as a flowchart illustrating an exemplary base software method for providing NFC-based payment with warranty options. The GUI setup may include several warranty options (e.g., manufacturer, third party, no warranty), a profile selection option, and an option to create and save extended code selection. When the profile selection box is selected, a user may enter or update user profile information such as an address, an email address, or a telephone number. Selecting the option to create and save extended code may result in display of a list of warranties that are available for purchase. The list of warranties may cover one or more items purchased by the user.

The base software method flowchart in FIG. 3 may begin when a use of a mobile device accesses a warranty application GUI (e.g., by selecting an associated icon in a display at their mobile device). Additionally, the user may select one or more warranty options, select preferences, create a warranty code attachment for a purchase or future purchases, and send a warranty code to a merchant. The warranty code may include or be appended to a payment code. After the warranty code has been sent to the merchant, the warranty information may be received from a warranty network, and a user of the mobile device may select a warranty to purchase.

In addition, the warranty information may be reviewed by the user via a display on the point-of-sale terminal or on the display of the user mobile device. The user may decide to purchase the warranty, after which transaction information relating to the purchase may be updated to include a warranty token. Then, a new warranty extended code may be created for a next transaction. In the instance when a user decides not to purchase a warranty, the transaction is processed normally without including a warranty code.

Figure 4:
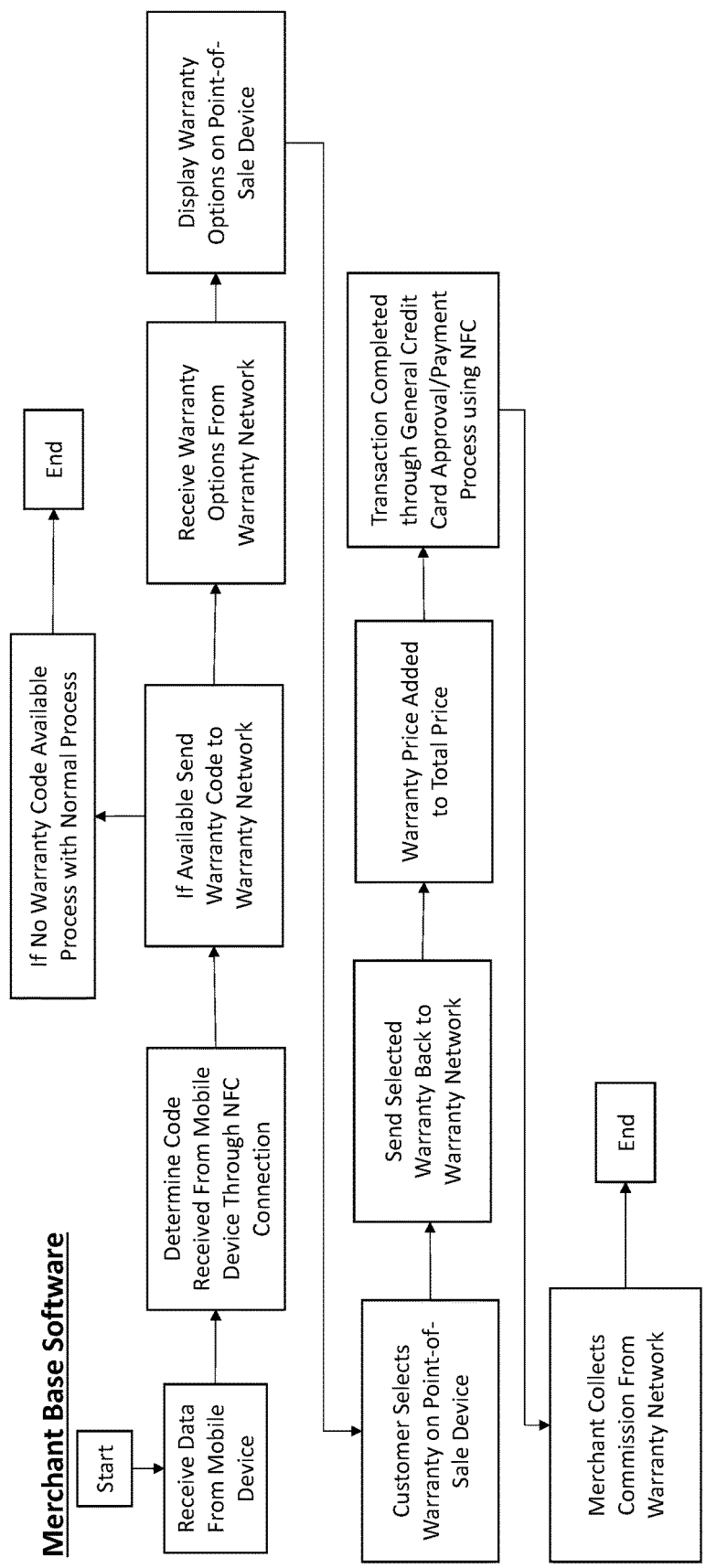
FIG. 4 is a flowchart illustrating an exemplary merchant base software method for providing NFC-based payment with warranty options.

FIG. 4 is a flowchart illustrating an exemplary merchant base software method for providing NFC-based payment with warranty options. A merchant system may receive data via an NFC data communication from a mobile device. The data may be related to an item being purchased by a user. It may then be determined whether there is a warranty code included with the data received. The merchant base software may determine whether the warranty code is a valid available warranty code. If so, warranty information may be received from a warranty network, and a list of warranty items may be displayed on a point-of-sale terminal or on the user mobile device. The user may then select a warranty from the display. After receiving a warranty selection, the merchant base software may send information relating to the warranty back to the warranty network. Next, a price for the warranty may be added to the price of the item purchased, and the transaction may then be completed using a general credit card payment approval process. The merchant may receive a commission from the warranty network. Where it may be determined that a warranty code is not valid, the transaction may be processed without a warranty.

Figure 5A:
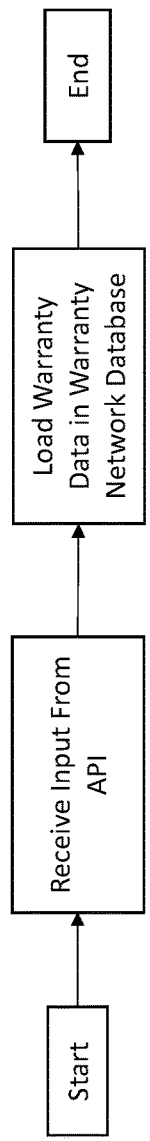
FIG. 5A and FIG. 5B are flowcharts illustrating exemplary warranty network base software methods for providing NFC-based payment with warranty options.
Figure 5B:
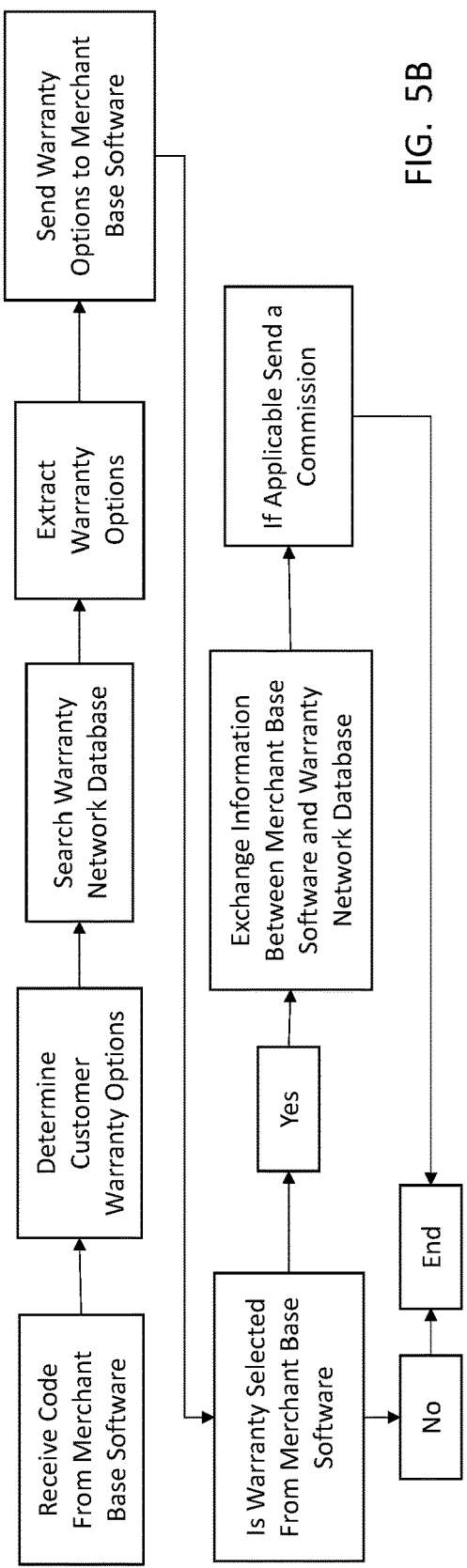

FIG. 5A and FIG. 5B are flowcharts illustrating exemplary warranty network base software methods for providing NFC-based payment with warranty options. Such software may be running at a warranty network server.

FIG. 5A illustrates information being loaded into a database at the warranty network. An API in the warranty network base software may receive an input, and in a second step warranty data relating to the input is loaded into a database.

FIG. 5B includes receiving a code from the merchant base software (e.g. merchant base software described with respect to FIG. 4). The warranty network base software may determine whether the code corresponds to a set of warranty options. If so, the warranty database may be searched for warranties that may be offered to a customer. Warranty options relating to the code may be extracted and then sent to the merchant base software. It may then be determined whether a warranty has been selected. If so, information may be exchanged between the merchant base software and the warranty network data base. Then, a commission may be sent to the merchant (when applicable).

FIG. 6 illustrates a matrix of information that may be stored in a warranty database used in a system for providing NFC-based payment with warranty options. The matrix includes a series of data fields for such data as merchant & user identification (ID), transaction number, warranty offered by, warranty cost, warranty length, and whether the warranty is accepted/declined. The merchant & user ID identifies the merchant, and the transaction number identifies the transaction. Warranties may be offered by various parties, such as manufacturers and third party warranty sellers. For example, transaction number 523 may be identified as occurring at merchant 0001 where two different warranties may have been offered by a manufacturer and two different warranties offered by a third party. Each of the warranties offered may have different costs, as well as different lengths of duration. As illustrated, three of the offers made in transaction 523 were declined, and one of the offers was accepted by a customer.

FIG. 7 is a flowchart illustrating an exemplary method for providing NFC-based payment with warranty options. A mobile device may be provided with a warranty application, a warranty GUI, warranty base software, an NFC data communication interface, a memory, a battery, and an OS. A merchant may be provided with a point-of-sale terminal that includes a display, an NFC data communication interface, and with warranty base software to run on a computer at the merchant.

A warranty network may be provided with warranty network software, a warranty network database, a list of third party warranties, a group of manufacturer warranties, and a API. A user may select a warranty application on their mobile device, select a set of warranty options, enter profile information, and select and save an extended code for the current or future transactions.

The mobile device may transmit information over an NFC data communication interface to a point-of-sale terminal. A warranty application running on the mobile device may attach a warranty code to the information transmitted to the point-of-sale terminal. Merchant base software running on the point-of-sale terminal or an associated computer at the merchant may extract the warranty code from the information transmitted from the mobile device and send the warranty code to a warranty network. The information transmitted from the mobile device over the NFC data communication may identify a credit or debit card that the user of the mobile device wished to use when purchasing an item.

The warranty code may be sent to the warranty network, and the warranty network software may then search for manufacturer warranties and third party warranties that are available for the item purchased that corresponds to the warranty code. When the warranty network identifies one or more available warranties, information relating to those warranties may be transmitted to the manufacturer, and that information may be displayed on the point-of-sale terminal or on the mobile device.

A warranty may be selected by the user, and that selection may be sent to the warranty network. A payment may be received and processed using a general credit card purchase approval process, and the merchant may be sent a commission.

In certain instances after a point-of-sale terminal receives a NFC communication from a mobile device, the point-of-sale terminal may display one or more warranty offerings that may be selected on the point-of-sale terminal without sending an NFC communication listing the warranty offerings to the mobile device. After a warranty is purchased, therefore, a confirmation that the warranty has been purchased may be sent to the mobile device by the point-of-sale terminal over the NFC communication interface, or the mobile device may be sent a confirmation from the warranty network over another data communication interface at the mobile device.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for providing near field communication (NFC)-based options, the method comprising:
   initiating a purchase transaction of at least one item over an NFC interface at an NFC-enabled mobile device, wherein the purchase transaction is initiated at a point-of-sale (POS) terminal;
   sending one or more options associated with the at least one item from the POS terminal to the NFC-enabled mobile device, wherein the options each correspond to a different additional item associated with the at least one item in the initiated purchase transaction and displayed for selection at the NFC-enabled mobile device;
   receiving a code associated with at least one selection from the options displayed at the NFC-enabled mobile device, the code sent by the NFC-enabled mobile device to the POS terminal; and
   modifying the initiated purchase transaction provided to an NFC-based authorization system, wherein the initiated purchase transaction is modified in accordance with the at least one selected option associated with the received code, and wherein the modified purchase transaction includes at least one additional item corresponding to the at least one selection associated with the received code.

2. The method of claim 1, wherein the at least one selection specifies a plurality of selected options, and wherein the received code is an extended code associated with the plurality of selected options.

3. The method of claim 2, wherein the extended code is further associated with profile information specific to the NFC-enabled mobile device.

4. The method of claim 2, wherein the extended code is stored in memory of the NFC-enabled mobile device, wherein the extended code is retrieved for a subsequent transaction.

5. The method of claim 2, wherein the NFC-enabled mobile device generates the extended code based on the plurality of selection options.

6. The method of claim 1, wherein the code is sent over a communication network from the NFC-enabled mobile device to a network server.

7. The method of claim 1, further comprising:
extracting the code from an NFC communication sent by the NFC-enabled mobile device to the POS terminal;
sending the extracted code from the POS terminal to a network server; and
receiving information regarding the at least one selected option sent by the network server to the POS terminal in response to the extracted code, wherein modifying the purchase transaction is based on the received information.

8. The method of claim 1, further comprising identifying that the received code is valid before modifying the purchase transaction.

9. The method of claim 1, further comprising stored information regarding a plurality of options in memory, wherein sending the one or more options comprises identifying the one or more options associated with the at least one item.

10. A apparatus for providing near field communication (NFC)-based options, the apparatus comprising:
an NFC interface that:
initiates a purchase transaction of at least one item with an NFC-enabled mobile device at a point-of-sale (POS) terminal;
sends one or more options associated with the at least one item from the POS terminal to the NFC-enabled mobile device, wherein the options each correspond to a different additional item associated with the at least one item in the initiated purchase transaction and displayed for selection at the NFC-enabled mobile device; and
receives a code associated with at least one selection from the options displayed at the NFC-enabled mobile device, the code sent by the NFC-enabled mobile device to the POS terminal; and
a processor that executes instructions stored in memory, wherein execution of the instructions by the processor modifies the initiated purchase transaction provided to an NFC-based authorization system, wherein the initiated purchase transaction is modified in accordance with the at least one selected option associated with the received code, and wherein the modified purchase transaction includes at least one additional item corresponding to the at least one selection associated with the received code.

11. The apparatus of claim 10, wherein the at least one selection specifies a plurality of selected options, and wherein the received code is an extended code associated with the plurality of selected options.

12. The apparatus of claim 11, wherein the extended code is further associated with profile information specific to the NFC-enabled mobile device.

13. The apparatus of claim 11, wherein the extended code is stored in memory of the NFC-enabled mobile device, wherein the extended code is retrieved for a subsequent transaction.

14. The apparatus of claim 11, wherein the NFC-enabled mobile device generates the extended code based on the plurality of selected options.

15. The apparatus of claim 10, wherein the code is sent over a communication network from the NFC-enabled mobile device to a network server.

16. The apparatus of claim 10, wherein the processor executes further instructions to extract the code from an NFC communication sent by the NFC-enabled mobile device to the POS terminal, and further comprising a network communication interface that:
sends the extracted code from the POS terminal to a network server; and
receives information regarding the at least one selected option sent by the network server to the POS terminal in response to the extracted code, wherein modifying the purchase transaction is based on the received information.

17. The apparatus of claim 10, wherein the processor executes further instructions to identify that the received code is valid before modifying the purchase transaction.

18. The apparatus of claim 10, further comprising memory that stores information regarding a plurality of options, wherein the processor executes further instructions to identify the one or more options associated with the at least one item.

19. A non-transitory computer-readable storage medium, having embodied thereon a program executable by a processor to perform a method for providing near field communication (NFC)-based options, the method comprising:
initiating a purchase transaction of at least one item over an NFC interface at an NFC-enabled mobile device, wherein the purchase transaction is initiated at a point-of-sale (POS) terminal;
sending, over an NFC interface, one or more options associated with the at least one item from the POS terminal to the NFC-enabled mobile device, wherein the options each correspond to a different additional item associated with the at least one item in the initiated purchase transaction and displayed for selection at the NFC-enabled mobile device;
receiving a code associated with at least one selection from the options displayed at the NFC-enabled mobile device, the code sent by the NFC-enabled mobile device to the POS terminal; and
modifying the initiated purchase transaction provided to an NFC-based authorization system, wherein the initiated purchase transaction is modified in accordance with the at least one selected option associated with the received code, and wherein the modified purchase transaction includes at least one additional item corresponding to the at least one selection associated with the received code.

* * * * *